United States Patent [19]

Heidecker

[11] 4,112,758
[45] Sep. 12, 1978

[54] MILK MONITORING METHOD AND APPARATUS

[75] Inventor: Robert F. Heidecker, Longmont, Colo.

[73] Assignee: Dairy Systems, Inc., Longmont, Colo.

[21] Appl. No.: 844,369

[22] Filed: Oct. 21, 1977

[51] Int. Cl.² .............................................. G01F 11/10
[52] U.S. Cl. ...................................................... 73/218
[58] Field of Search ................. 73/217, 218, 219, 220, 73/223

[56] References Cited

U.S. PATENT DOCUMENTS

| 308,001 | 11/1884 | Sommer | 73/218 |
|---|---|---|---|
| 925,390 | 6/1909 | Royer | 73/218 |
| 3,513,700 | 5/1970 | Wirsner et al. | 73/218 |

*Primary Examiner*—Herbert Goldstein
*Attorney, Agent, or Firm*—John E. Reilly

[57] ABSTRACT

A milk volume metering method and apparatus is particularly suitable for use in automated or semiautomated milking systems of the type which will permit computerized monitoring of the total volumes produced by each cow, flow capacity, and conductivity, temperature of each cow during the milking operation. Other functions can be closely monitored and controlled preliminary to, during and after the milking operation. The metering apparatus permits filling to a predetermined level through a unique form of inlet and flow control arrangement which will greatly minimize bubbling and presence of air in the milk, and a rotor is cooperatively disposed in the housing in relation to diametrically opposed recesses in such a way as to be responsive to the flow of milk into the housing for accurate filling of a plurality of successive compartments in the rotor and determining the volume rate of flow of milk by counting the number of compartments as they successively empty the milk through a discharge port over a given period of time. Means are also provided to facilitate drainage and flushing of the housing and other interior parts of the housing between the milking operations.

28 Claims, 10 Drawing Figures

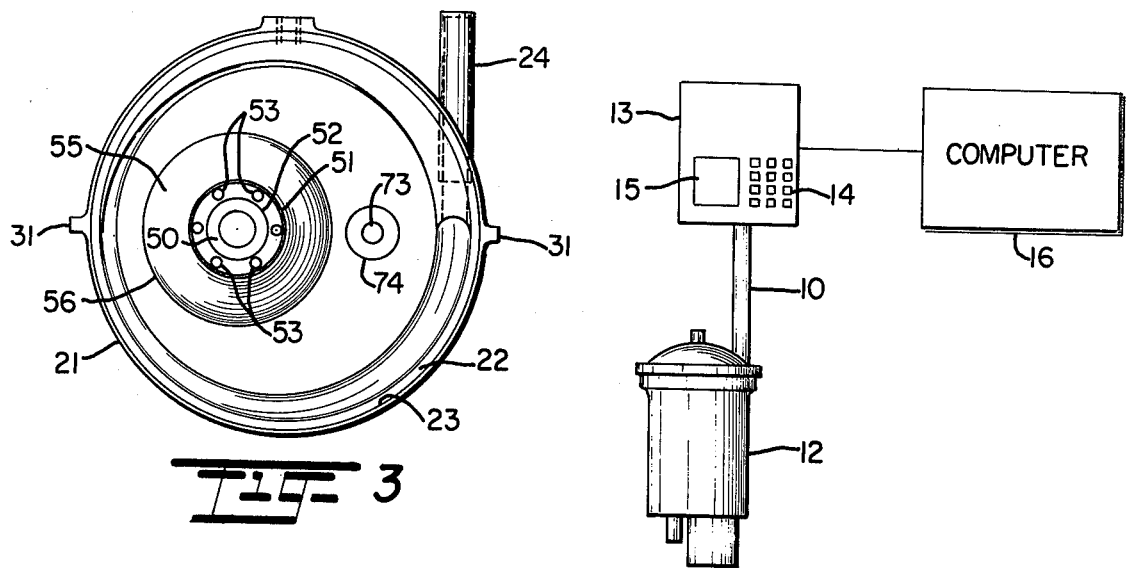
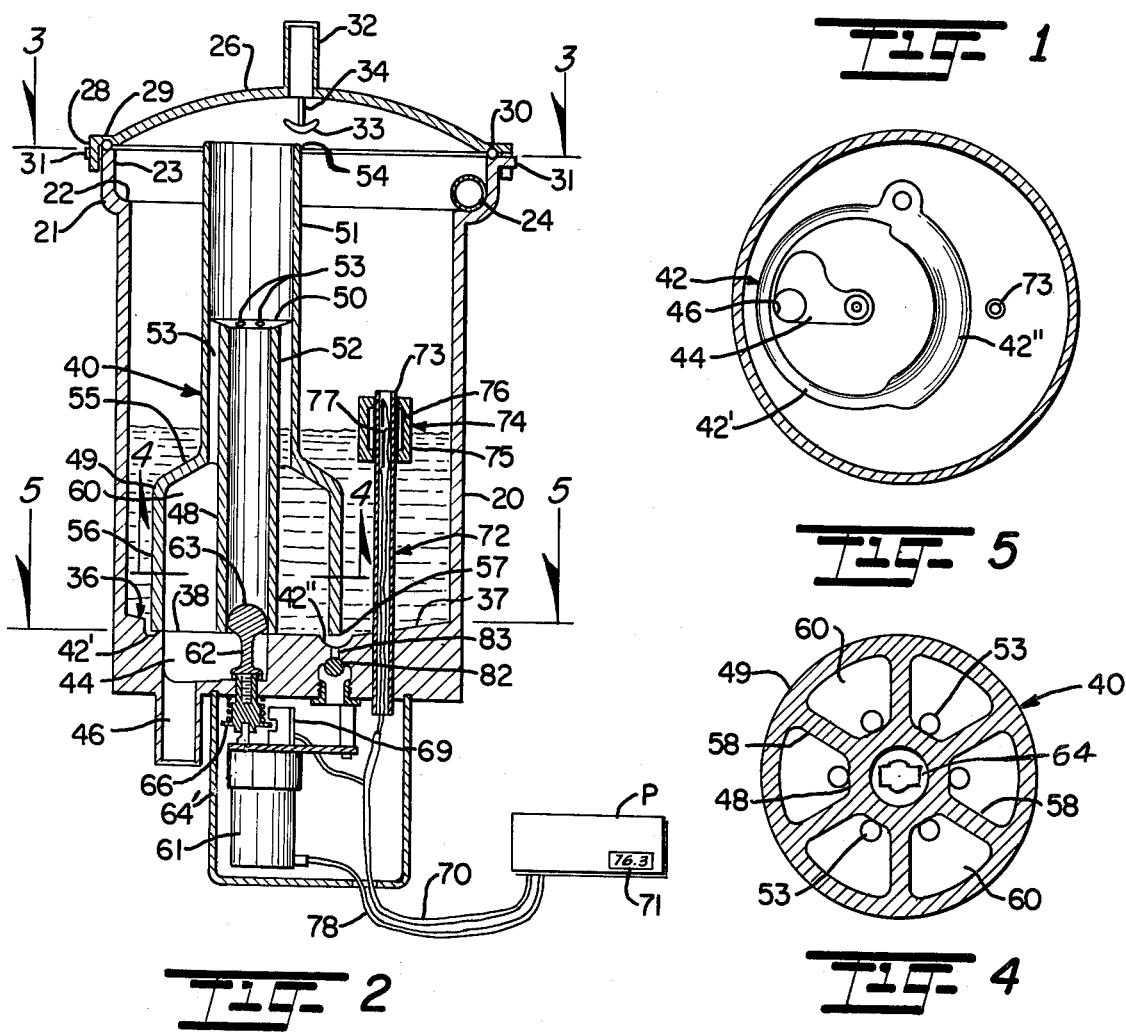

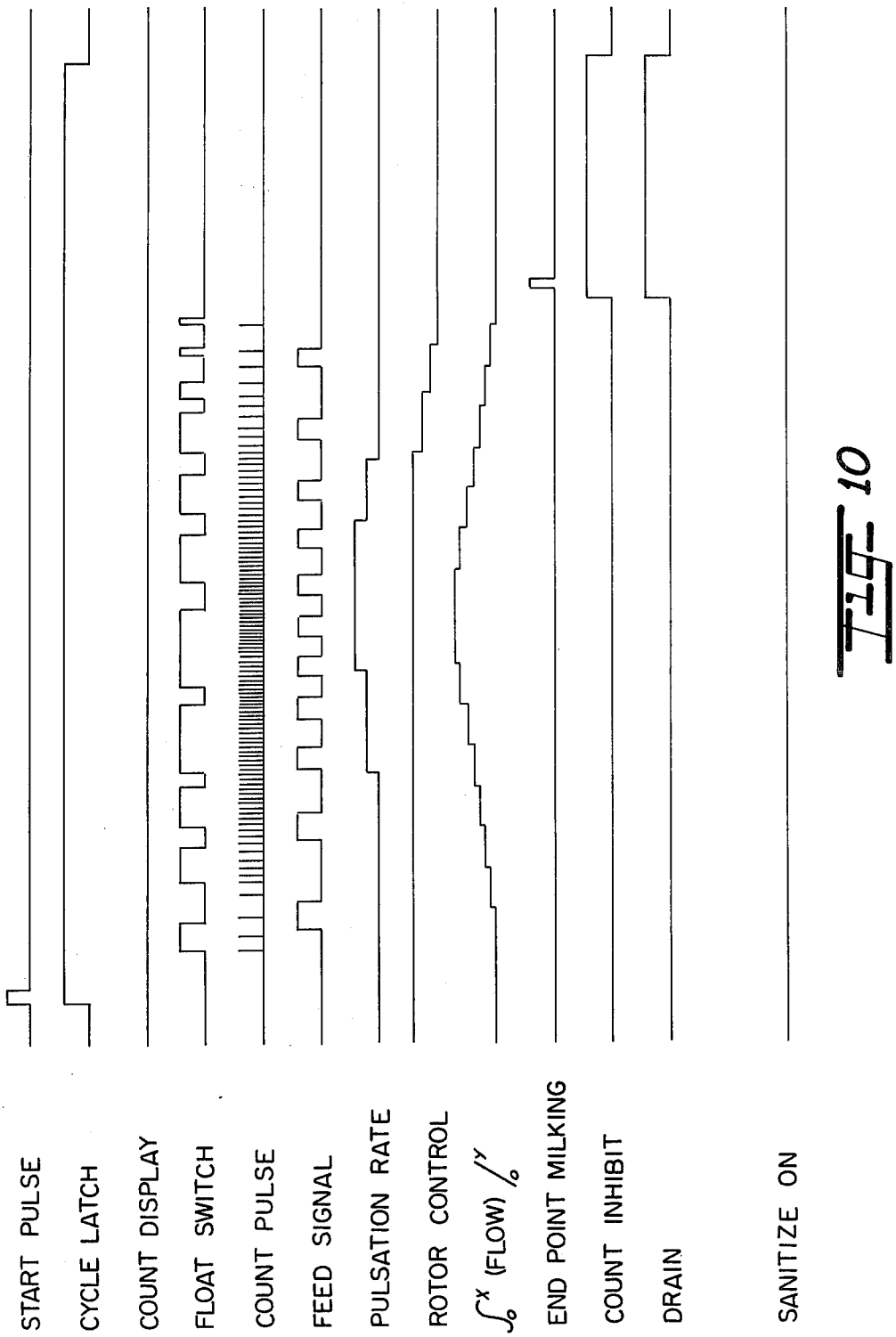

4,112,758

MILK MONITORING METHOD AND APPARATUS

This invention relates to novel and improved milk volume metering method and apparatus and more particularly relates to apparatus adapted for measuring the volume rate of flow of milk from each cow during manual or automatic milking operations which is particularly characterized by its accuracy, vacuum stability, cleaning in place and conformability for use with computerized readout of information.

BACKGROUND OF THE INVENTION

Liquid metering devices which utilize a rotating member having a cavity or cavities of known volume have been devised wherein the flow is measured by counting the number of times each cavity is filled and emptied. Representative of this approach is U.S. Pat. to Stitzel No. 297,092 in which filling and emptying of the cavity is effected through use of a piston. U.S. Pat. to Porterfield No. 3,200,643 also discloses a metering device in which compartments are alternately filled and emptied and, since the capacity of each compartment is known, determination of quantity of liquid passing through the meter is determined by counting the number of revolutions of the drum.

Special problems are inherent in the measuring of the volume rate of flow of milk produced during the milking operations, since the rate of flow will vary greatly with each animal and particularly at lower rates of flow, close accurate measurement through utilization of commercially available systems has been difficult at best. For instance U.S. Pat. to Olander No. 3,783,837 is directed to a system for regulating the amount of vacuum or negative pressure employed in a milk receiver in response to the rate of milk flow. U.S. Pat. to Needham No. 3,733,016 is directed to a system for detecting the flow of milk in an automated milking machine in such a way as not to permit teat cup removal in the event of a temporary interruption in flow.

Another problem associated with milk volume metering devices is to establish close correlation between the operation of the metering unit and other sensing and monitoring operations to be conducted during the milking operation, such as, temperature sensing, feed control, fluid conductivity sensing which is specifically useful in the detection of bovine mastitis and the controlled application of vacuum to the metering device during removal of the teat cups at the conclusion of the milking operation so as to minimize the possibility of injury to the udder while avoiding premature removal in the event of temporary interruptions in milk flow.

It is therefore highly desirable to provide for a liquid metering apparatus which is extremely accurate and capable of operating at flow rates down to as low as 0 lbs. per minute but which is not affected by vacuum or pressure fluctuations and will not cause fluctuations to occur. Another desirable feature is that the metering device be capable of being cleaned automatically in place at the conclusion of each milking operation in a rapid efficient manner, is low in cost, and does not require special milk filtration. Still further, the metering device should minimize the formation of bubbles or foam as the milk enters and flows through the metering apparatus.

SUMMARY OF THE INVENTION

It is therefore an object of the present invention to provide for a novel and improved metering system which is particularly adapted for use in measuring the volume flow rate of milk produced by each cow in an automated milking operation.

It is another object of the present invention to provide for a milk meter which is accurate, stable and conformable for use with computer based controls to provide a digital readout of the volume flow rate of milk; and further wherein readout error of the system is less than one percent over an extremely wide range of fluctuations in flow rate.

A further object of the present invention is to provide a metering system which is readily conformable for use with automatic teat cup removal apparatus in such a way as to minimize injury to the cow and provides a method of controlling milk flow at the meter inlet and rotor inlet within the meter so as to facilitate removal of air from the milk without special filtration devices.

An additional object of the present invention is to provide in a metering system for electronic controls to permit the meter to start rapidly at the beginning of the milking operation to accommodate high volume rates of flow and subsequently to allow the system to accommodate extremely low rates of flow nearing the end of the milking operation without sacrificing accuracy in measurement of the entire volume of milk produced by each cow.

An additional object of the present invention is to provide in association with a metering device for closely coordinated, computer based control functions to regulate vacuum and pulsation ratio, or vacuum applied to the teats, time monitoring of various operator and automatic functions, temperature and conductivity monitoring for health detection, production monitoring and digital readout or display; and further to regulate feeder control for set pre-feed, computed feed or variable feed proportioned to milking volume, automatic teat cup removal control and interim flushing and cleaning operations between each milking cycle.

In accordance with this invention, automated or manually-assisted, automated milking operations can be carried out in a highly efficient and dependable manner with a minimum of training and maintenance required for the operator. In this respect, the system is capable of accurately measuring the volume and volume flow rate of milk produced from each cow while permitting accurate control in monitoring and other related operations hereinbefore referred to, such as for instance, temperature and conductivity, feed rate control and automatic detachment at the end of each milking operation in such a way as to be closely correlated with the removal of vacuum to the teat cups. A principal feature of the system resides in the construction and arrangement of the metering apparatus which is broadly characterized by an outer housing having a tangential flow inlet at its upper end communicating with flow control means in the form of a ledge for constraining the flow of milk along a generally spiral path around the inner wall of the housing to fill up an annular area in the lower end of the housing between the housing wall and an inner concentric rotor. The lower end of the housing is filled to a predetermined level at which point sensing means will generate a signal in response to reaching that level to energize the motor drive for the rotor. The rotor contains a plurality of cavities of equal size which communicate with the annular space through a recessed portion in the bottom wall of the housing to cause each cavity in succession to be filled with milk and, under continuous rotation, to traverse a second recess in communication with a lower discharge port in the housing to cause each cavity in succession to be emptied. A vacuum by-pass communicates with the interior of the rotor and housing through the discharge port to permit the removal of air during the metering operation. Counting means which preferably are in the form of an optical sensor will sense the number of cavities traversing the second or discharge recess and through a logical interface provide a digital readout of the volume rate of flow through the meter until the milking operation is completed. A drain valve is also provided to permit drainage or removal of the milk remaining in the annular space at the completion of the milking operation prior to the flushing operation. Both the rotor and housing are so constructed as to facilitate rapid cleaning which is preferably accomplished with the aid of the vacuum by-pass by introduction of fluid through an upper fluid inlet to thoroughly wash the inside of the housing and rotor as a preliminary to the next milking operation.

BRIEF DESCRIPTION OF THE DRAWINGS

Other features, advantages and capabilities of the present invention will become more readily appreciated from the following detailed description when taken together with the accompanying drawings, in which:

FIG. 1 is a somewhat schematic view of a portion of a dairy automation system including the preferred form of milk metering apparatus in accordance with the present invention.

FIG. 2 is an enlarged view in vertical section of the preferred form of milk metering apparatus.

FIG. 3 is a cross-sectional view taken about lines 3—3 of FIG. 2.

FIG. 4 is a cross-sectional view taken about lines 4—4 of FIG. 2.

FIG. 5 is a cross-sectional view taken about lines 5—5 of FIG. 2.

FIG. 10 is a timing chart showing the sequence of operations carried out by the metering apparatus in accordance with the present invention.

DETAILED DESCRIPTION OF THE PREFERRED EMBODIMENT

Figure 6:
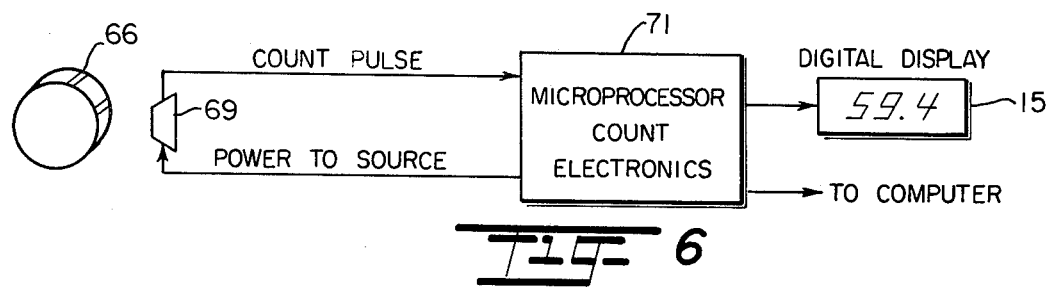
FIG. 6 is a somewhat diagrammatic view of a portion of the electronics control for the milk metering apparatus of the present invention.

Referring in detail to the drawings, there is represented in FIG. 1 a portion of a dairy automation system and particularly the parlor unit which is placed in each stall in carrying out automated milking operations. As represented the unit includes a main standard or vertical post 10 having a preferred form of metering apparatus 12 mounted thereon together with an electronics control unit 13 provided with a keyboard represented at 14 and digital display unit represented at 15, the electronic controls unit interfacing with a remotely located computer represented at 16 which is adapted to process data from a number of parlor units. Although not shown, other auxiliary parts of each parlor unit would include an automatically detachable milker claw and the various valves adapted to control the vacuum applied to the metering apparatus 12 as well as to control the milk flow and sanitizing solutions in a manner to be hereinafter described.

As a setting for the present invention, the sequence of operations which take place in an automated milking cycle broadly can be broken down into three major phases: First the cow is stimulated by spraying warm water on the udder in a pulsating mode; secondly, she is milked with the temperature, production and time continually monitored and displayed through the electronics control unit 13; and finally the automatic milker claw is detached and sanitized. During the milking cycle the feed may be automatically dispensed in proportion to milk production. The keyboard 14 on the electronics control unit will permit the dairyman to control stimulation, drying of the udder and placement of the claw onto the teats to start the milking cycle. Thereafter the milk production, temperature and time are automatically controlled, monitored and displayed through the electronics control unit 13; and following the end of the milking cycle unit 13 will automatically control detachment of the milker claw and the sanitizing operations performed on the metering apparatus and the milker claw in preparation for the next cycle.

In accordance with the present invention, the metering apparatus 12 will be described with particular reference to its use in measuring milk flow rate and milk weight as the cow is being milked; and while the metering apparatus will be hereinafter described specifically in connection with an automated milking operation, it will be readily appreciated that it is readily conformable for use with semi-automatic or manual milking operations. To this end, the preferred embodiment of metering apparatus as illustrated in FIGS. 1 to 5 is comprised of an elongated cylindrical housing 20 having an open top and provided with an enlarged portion 21 adjacent to the top which defines a shoulder 22 extending along the inner wall of the housing as well as an upper flat edge 23 at the top of the housing. A tangential inlet port 24 is directed into the upper open end of the housing directly above the shoulder 22, the shoulder defining a generally circular ledge which is progressively reduced in thickness from a point directly beneath the inlet port 24 spirally inward through substantially 360 degrees so as to taper into the wall of the housing proper. In this manner, the milk introduced into the housing will be constrained to flow initially along the ledge and to undergo a gradual reduction in velocity of flow as it passes therealong with any milk overflowing the ledge tending to flow downwardly by gravity at a considerably reduced rate so as to minimize foaming and reduce the presence of air in the milk. A vacuum is imposed upon the interior of the housing in a manner to be described and will tend to remove any air as it is released from the liquid in passing along the ledge.

In order to seal the upper end of the housing, a generally convex cover 26 has a downturned cap 28 around its outer periphery with an upper flat surface 29 which is disposed in flush engagement with the rim or flat surface 23. A seal 30 is interposed in shallow recesses aligned in the upper flat surface 29 and lower flat surface 23 and the cover is caused to sealingly engage the upper flat surface of the housing by means of clamping members 31. The upper central or domed portion of the cover 26 is provided with a separate liquid inlet 32 and a deflector 33 is suspended beneath the inlet by means of a rigid bar 34 and which in a manner to be described will cooperate in distributing a sanitizing liquid throughout the housing and interior of the metering apparatus after the completion of the milking cycle.

A bottom wall 36 forms the base of the housing, the bottom wall being relatively thick with an upper concave surface 37 which curves downwardly into a lower relatively flat surface portion 38 which is offset from the central axis of the housing and is adapted to accommodate the lower edge of a rotor assembly designated at 40. A first recess 42 includes a shallow depression 42' extending along the major distance of the outer peripheral edge of the flat surface portion 38 and communicates with a broader and deeper groove or depression 42" which completes the circle and defines the inlet port for the flow of milk from the outer annular space in the housing surrounding the rotor into the interior of the rotor assembly. Preferably the inlet port is deepened from one end of the shallow groove 42' to the other end. In turn, a second recess 44 is located on the diametrically opposite side of the flat surface from the inlet port 42" but is relatively broad and deep so as to extend radially from the center of the rotor assembly to a point just short of the outer peripheral edge of the flat surface, the second recess being relatively deep as illustrated so as to communicate directly with a discharge port 46 extending through the bottom wall 36 of the housing.

The rotor assembly 40 is centered with respect to the first and second recesses 42 and 44 and is broadly comprised of inner and outer concentric tubular portions 48 and 49, respectively. The inner concentric tubular portion 48 is of uniform diameter and extends from the lower edge of the rotor assembly upwardly through the greater length of the outer concentric tubular portion 49 to terminate in an upper edge 50. The outer concentric tubular portion 49 includes an upper section 51 of reduced diameter which is disposed in relatively closely spaced relation to the inner tubular portion and is interconnected to the inner tubular portion by an annular wall 52 provided with a series of equally spaced circumferential openings or bores 53. The upper section 51 extends from an upper edge 54 which is horizontally aligned with the upper edge of the housing 20 throughout the greater length of the housing and verges into a generally conical wall section 55 then into a lower, enlarged tubular section 56. The enlarged tubular section is connected to the inner concentric tubular portion 48 by a series of equally spaced radially extending partition walls 58 so as to define a series of generally trapezoidal compartments 60 bordered by the inner and outer concentric tubular portions and the partition walls. The enlarged lower tubular section 56 is dimensioned such that its lower edge 57 traverses the flat surface 38 just inwardly of the shallow groove 42' but traverses the center of the inlet port 42" whereby to permit communication between the annular space in the housing and the compartments 60. Further the lower edge 57 extends along the outer peripheral edge of the flat surface 38 just outwardly of the second recess 44 so as to define with the flat surface 38 a seal which isolates the liquid in the annular space from the second recess and confines the flow of liquid or milk from the annular space only through the inlet port of the first recess into each successive compartment as it traverses the inlet port.

Motive drive means in the form of a variable speed motor 61 disposed within a motor housing 64' has a spring-loaded drive shaft 62 projecting upwardly through the bottom wall of the housing into the lower end of the inner concentric tubular portion 48. The upper terminal edge 63 of the drive shaft is in the form of a non-circular blade which is inserted into a correspondingly shaped elongated slot 64 formed in the lower end of the tubular portion 48 so as to impart rotation to the rotor assembly under the driving force of the motor 60. In order to count the number of revolutions of the rotor assembly and specifically the number of compartments traversing the second recess 44 during a complete milking cycle, a disk 66 having alternate transparent and opaque areas disposed for rotation at the lower end of the drive shaft, the spacing of the transparent areas corresponding to that of the compartments; and photodiodes define optical sensing means 69 which generate signals in response to passage of the transparent areas past the sensing means which signals are transmitted through cable 70 to suitable count electronics 71 in a well-known manner.

In order to sense the level of milk in the housing, a float assembly 72 includes an elongated tubular member 73 which extends upwardly through the bottom wall of the housing and serves to support a switch member 74 at its upper end which is located just above the enlarged tubular portion 56 of the rotor assembly. The switch member 74 may be defined by an outer generally buoyant sleeve 75 containing a magnetic ring 76 in confronting relation to a reed switch element 77. Upward movement of the sleeve 75 in response to rising of the milk within the annular space will cause the magnet to advance upwardly past the reed switch 77 thereby closing the switch and transmitting the signal through a separate line in the cable 70 to the power supply represented at P and, through the cable 78, will transmit an energizing signal to the motor whereby to impart rotation to the rotor assembly 40.

A vacuum is applied from a suitable vacuum source, not shown, through the discharge port 46 and interior of the rotor including the inner concentric tubular member 48 so as to create a negative pressure condition within the housing and encourage the flow of milk from the annular space through the inlet port 42" in the compartment. Once one or more milking cycles are completed and vacuum is no longer applied, a gradual increase in pressure will cause a check valve 82 to open in a drain line 83 and permit removal of any liquid remaining within the housing, the check valve being located directly beneath the deeper end of the inlet port 42".

Briefly reviewing the operation of the metering assembly, the liquid is introduced through the inlet port at a substantial velocity but in traversing the inner ledge of the housing its horizontal velocity is reduced sufficiently to allow it to pass gradually down over the ledge. In order to assure that the liquid is evenly distributed along the housing wall, the ledge 22 is gradually narrowed or reduced in width as it curves downwardly or inwardly along the wall so as to reduce the velocity of the liquid and the amount of air contained therein. When the meter housing is filled with milk to level L, the float or sleeve member 74 containing the magnet will close reed switch 77 to energize the motor drive for the rotor assembly 40. As the rotor assembly is rotated, the milk will flow through the inlet port 42" into each of the six cavities of the rotor assembly as each in succession passes over the inlet port 42". As each filled cavity then passes in succession over the outlet or second recess 44, it is electrically counted by means of the optical sensor and the count electronics represented at 13 as the milk is emptied through the discharge port 46. For instance, assuming that the counter is preset to 3 lbs., this would represent the amount in the housing when filled to the level L. As additional liquid is introduced to cause the rotor to be activated, rotation of the rotor assembly will cause the counter to increment from 3.0 lbs. to 3.1, 3.2, etc. Accordingly, the relative size of each cavity to that of the annular space is such that the amount of milk flowing into each cavity would be established at 0.1 lb. Accuracy of filling each cavity is improved by employing a groove or depression 42" having a relatively small radius on one end which increases toward the opposite end such that as the liquid enters the first recess, then passes into the cavity, it will start at a very small flow rate to minimize the formation of bubbles or foam. The liquid will enter each cavity until it reaches level L; and since the cavity area becomes restricted near the top, extremely close accuracy of measurement is maintained even though the level at point L may vary by several percent.

When the input flow from the cow is reduced, the counter is inhibited by a signal generated in response to removal of the teat cups so that no additional counts are added and the rotor is then rotated continuously until the last 3 lbs. of liquid are permitted to flow out through the cavities from the annular space in the housing. Upon completion of the milking cycle, after cleansing and sanitation of the assembly as hereinafter described, the vacuum is removed from inside the housing and the check valve will open permitting complete drainage of any remaining liquid in the housing. This may be done at the end of milking several cows to permit removal of any residual liquid and need not be done at the end of each milking cycle.

The inlet 32 in the cover 26 is used to inject cleaning liquid at the end of milking in order to automatically wash the inside of the meter with the aid of the vacuum system, if desired. The incoming liquid is deflected by the deflector member 33 such that liquid is diverted to contact the cover and all parts of the rotor assembly as well as the inner wall of the housing. This sanitizing liquid, which for instance may simply be clear water, will be allowed to pass down through the center of the rotor past the motor drive and through the discharge tube 46. The path along the inside of the rotor also provides a vacuum bypass for air flow that is independent of the metered liquid flow through the cavities during the milk metering operation.

As represented in FIG. 5, a conventional form of optical sensor circuit may consist of a photodiode 69 which will sense passage of the disk 66 and generate a pulse to the counter 71 for each light area on the disk. The circuitry illustrated in FIG. 6 illustrates the manner in which the speed of the rotor is controlled in response to milk level and milk rate of flow through the meter housing: Transistor 85 is designed to be conductive during metering of the milk through the rotor assembly and non-conductive during the drain cycle. The network comprised of resistors 86 and 87 diode 88 and capacitor 89 together with the motor 60 are designed such that the rotor will be turned only for one count when the input flow rate is very low but further will allow the meter to start rapidly as milking is begun. In addition, it will provide a filtered drive to the motor 60 during milking such that the motor is not turned totally on and off as the reed switch 77 is opened and closed during milking. Transistors 82' and 83' along with resistor 84 function in a conventional manner to provide current amplification or gain and reduce the size of the capacitor 89 in the circuit.

Figure 7:
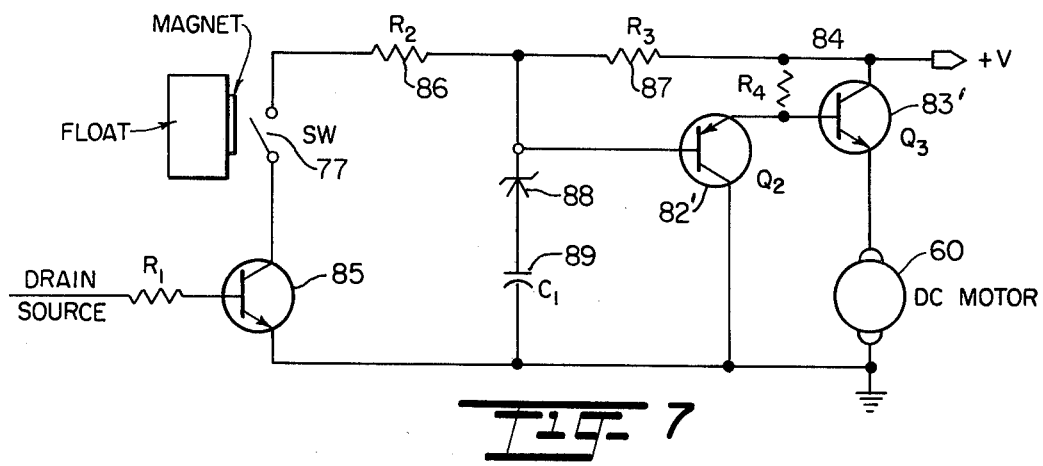
FIG. 7 is another somewhat diagrammatic view of a portion of the electric circuitry for the apparatus of the present invention.
Figure 8:
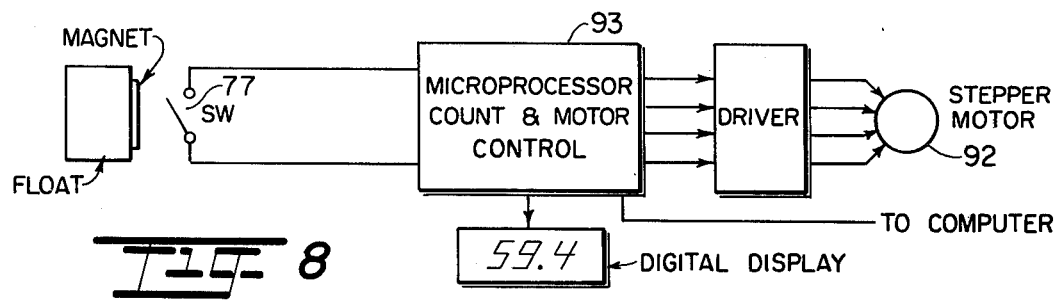
FIG. 8 is a somewhat schematic view of a modified form of electronics circuit.
Figure 9:
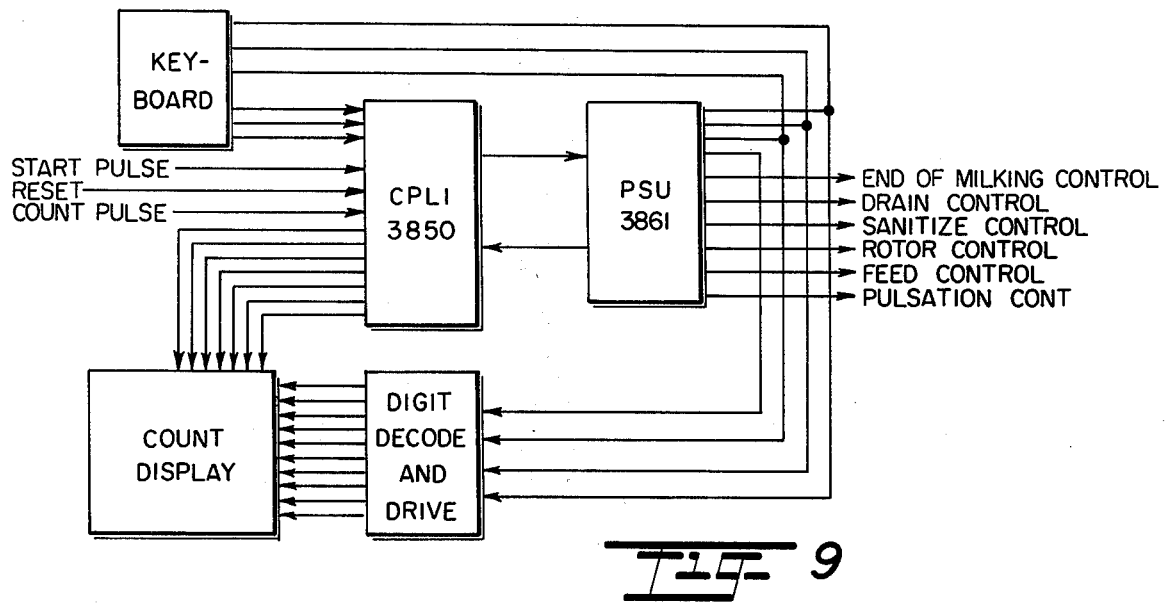
FIG. 9 is a block diagram of the interface employed between a keyboard and computer.

An alternate form of circuit is illustrated in FIGS. 7 and 8 to that shown in FIGS. 5 and 6 having a stepper motor 92 which is substituted for a DC brush-type motor and optical transducer or counter. In this arrangement, the float switch 77 when closed will feed a signal directly into a microprocessor 93 which then determines the drive to the stepper motor and as a result of the number of steps of rotation determines the tount to be displayed. The logarithm for controlling speed, while similar to that of the form of circuit illustrated in FIG. 5, will differ somewhat in the microprocessor designed by using the actual flow rate information in an adaptive control mode. The functions which are performed in the digital mode are illustrated in FIG. 8, namely: The counter display, preset, and exhibit; the adaptive feed control; the adaptive pulsation control; the rotor velocity control; the end of milking sensor; the drain signal control; and the sanitizing control. The relative time sequence of each function is represented in the timing diagram of FIG. 10. From a consideration of FIGS. 9 and 10 the operating sequence can be generally described as follows: The metering is started at the beginning of milking each cow by pressing a start button. A cycle latch is then set and remains on until the milking is completed or the reset button is pressed. The count display is preset to 3.0 lbs. at the time the start pulse occurs. As the milk approaches level L, the float switch 77 is on as shown in line 4 and the count pulse, line 5, occurs once for each 0.1 lb. of milk drained from the rotor. This count pulse is the basis for computing accumulative weight or volume per cow, instantaneous flow rate and the weight per unit time.

During the flow period the rate pulses are used to provide a feed signal, line 6, that can be used to turn on a feeder for a certain length of time and for a preset amount of milk. The flow pulses are also used to control the pulsation rate, line 7, such that the optimal pulsation rate is realized. The flow pulses are also used to control the rotor velocity, line 8, and finally to determine the end point of the milking cycle, line 10. When that end point is reached, the pulses to the count display are inhibited by the count inhibit line 11 and the drain, line 12, is activated for a preset period to insure that the 3 lbs. of liquid are drained. After completing the milking cycle for several cows, the meter automatically senses that a clean-in-place cycle has begun without the use of separate switches or wires. During this time, the rotor is turned slowly to insure that the sanitizing solution touches all surfaces.

From the foregoing it will be appreciated that the metering apparatus as set forth and described herein possesses a number of notable advantages and improvements in measuring milk flow rate or milk weight of a cow. By virtue of the relationship established between the rotor assembly, inlet and outlet recesses or ports between the cavities and annular space in the housing coupled with the configuration of the rotor assembly itself, accuracies of better than 1% can be achieved over a wide range of flow rates. Accurate measurement or metering is not affected by vacuum or pressure fluctuations and does not cause fluctuations to occur for the reason that the apparatus permits total bypass of air through the center of the rotor and filling of the cavities will occur independently of the air pressure in the housing. Introduction of the milk and its immediate reduction in velocity minimizes any frothing or foaming so as to also contribute accuracy in measurement. Also, the reed switch float sensor affords a highly sensitive means of detecting milk level so that the rotor assembly is extremely sensitive to the milk level both in terms of starting and stopping as well as the rate of rotation of the rotor assembly. Thus when the motor is activated by the float sensor it will gradually accelerate to a maximum speed as long as the milk continues to flow into the meter at a rate equal to or greater than the rate of removal or emptying. The maximum speed preferably is set at a level exceeding the maximum flow of milk, such as, on the order of 20 lbs. per minute. If the milk flow is reduced, the filtered drive circuit would permit the motor to slow down but would not permit it to stop until the end of the milking cycle is reached.

The monitoring unit of the present invention is characterized by being comprised of a minimum number of parts relatively low in cost which eliminates other elements customarily required in milk metering units. For instance, the unit of the present invention does not require a milk filter, special sealing between the rotor assembly and meter base or bottom wall or elaborate electronic equipment in direct association therewith.

While a preferred form of milk monitoring apparatus has been shown and described in detail, it is obvious that this invention is not to be considered as being limited to the exact form disclosed and that changes in detail and construction may be made therein within the scope of this invention without departing from the spirit thereof.

What is claimed is:

1. In milk monitoring apparatus adapted for use with mechanical milking equipment to measure the milk volume production of cows, the combination comprising:
    a generally cylindrical housing having an elongated central axis, an inlet port adjacent to the upper end of said housing, flow guide means along the inner wall of said housing adjacent to the upper end to reduce the velocity of flow of milk from said inlet port into said housing;
    a cover adapted to establish flush engagement with the upper edge of said housing, and sealing means interposed between the flat surface of said cover and the upper edge of said housing;
    a bottom wall extending across the lower end of said housing provided with an upper surface including a first shallow recess formed in the surface and a second relatively deep recess in diametrically opposed relation to the first recess, said second recess communicating with a discharge port in said bottom wall;
    rotor means centered in said housing with respect to said recesses, motive drive means including a drive shaft drivingly connected to said rotor means to impart rotation to said rotor means within said housing at a predetermined rate of speed, said rotor means divided into a plurality of compartments at equally spaced circumferential intervals in open communication with the upper surface of said bottom wall, each compartment adapted to be filled with milk from the annular space between such rotor means and the cylindrical housing as it traverses said first recess and to be emptied of milk as it traverses said second recess;
    a float member including first sensing means for sensing the level of milk in the annular space and to generate a signal energizing said motive drive means when the milk reaches a predetermined level in said annular space; and
    second sensing means adapted to count the number of compartments traversing said second recess.

2. In milk monitoring apparatus according to claim 1, the bottom wall of said housing further characterized by having an upper flat surface portion surrounded by a generally concave annular surface portion curving upwardly from said flat surface portion, said first recess extending circumferentially along at least a portion of the outer periphery of said flat surface portion and said second recess extending in a radial direction along said flat surface portion.

3. In milk monitoring apparatus according to claim 1, said rotor means having inner and outer concentric, generally tubular sections, said outer tubular section overlying said first recess.

4. In milk monitoring apparatus according to claim 1, further including means for applying a vacuum to the interior of said housing.

5. In milk monitoring apparatus according to claim 1, said cover being of generally convex configuration and having a liquid inlet therein, and a deflector member disposed in spaced relation beneath said liquid inlet.

6. In milk monitoring apparatus according to claim 5, said cover having a generally downturned cap extending around the outer peripheral edge of said cover and adapted to be positioned in sealed engagement with the upper edge of said housing.

7. In milk monitoring apparatus according to claim 1, said flow guide means characterized by a ledge formed along the inner wall of said housing adjacent to the upper end thereof and being progressively reduced in thickness from a point adjacent to said inlet port inwardly along the inner wall of said housing.

8. In milk monitoring apparatus adapted for use with mechanical milking equipment to measure the milk volume production of cows, the improvement comprising:
    a generally cylindrical housing having an elongated central axis, an inlet port adjacent to the upper end of said housing, a ledge formed along the inner wall of said housing adjacent to the upper end and being progressively reduced in thickness from a point adjacent to said inlet port;
    a cover including a separate liquid inlet therein, and sealing means interposed between the flat surface of said cover and the upper edge of said housing;
    a bottom wall extending across the lower end of said housing provided with an upper generally flat surface portion including a first outer peripheral relatively shallow recess formed in the flat surface portion, and a second relatively deep radially extending recess formed in said flat surface portion substantially in diametrically opposed relation to the first recess, said second recess communicating with a discharge port in said bottom wall;
    rotor means being centered in said housing with respect to said recesses, motive drive means including a drive shaft being drivingly connected to said rotor means to impart rotation to said rotor within said housing at a predetermined rate of speed, said rotor means having inner and outer concentric, generally tubular sections, said outer tubular section traversing said first recesses in response to rotation imparted thereto, and radial partitions extending at equally spaced circumferential intervals between said inner and outer tubular section to divide said rotor into a plurality of compartments, each compartment adapted to be filled with milk from the annular space between said outer tubular portion and cylindrical housing as it traverses said first recess and to be emptied of milk as it traverses said second recess;

a float member including means for sensing the level of milk in the annular space and to generate a signal energizing said motive drive means when the milk reaches a predetermined level in said annular space;

sensing means adapted to count the number of compartments traversing said second recess; and means for applying a vacuum to said housing.

9. In milk monitoring apparatus according to claim 8, said bottom wall including a generally concave surface portion curving upwardly from said generally flat surface portion with the first recess formed to extend circumferentially along at least a portion of the outer periphery of said flat surface portion, said first recess progressively increasing in depth from one end to the other.

10. In milk monitoring apparatus according to claim 8, said cover having a generally downturned outer peripheral edge overlying the upper edge of said housing and means for establishing sealed engagement between said cover and the upper edge of said housing.

11. In milk monitoring apparatus according to claim 8, said motor drive means being defined by a variable speed motor and a filtered drive circuit for said variable speed motor to activate said motor in response to signals received from said float member sensing means.

12. In milk monitoring apparatus according to claim 8, further including a drain valve responsive to removal of the vacuum within said housing to permit complete drainage of milk from the housing at the end of each milking cycle.

13. A milk volume metering unit adapted for measuring the flow capacity of milk produced by a cow during a milking operation comprising:

a generally cylindrical housing having a tangential flow inlet at its upper end;

sensing means to sense the level of the milk in the lower end of said housing and to generate a signal in response to filling of said housing to a predetermined level;

rotor means mounted for rotation within said housing including equally spaced compartments disposed within the lower end of said housing normally isolated from the milk delivered by said flow control means into the annular space at the lower end of said housing between said rotor means and inner wall of said housing, each compartment being open at its lower end and movable across a first inlet port in communication with the milk in the lower end of said housing to fill each compartment in succession to a predetermined level, each compartment rotatable in response to rotation of said rotor means past a second outlet port in the lower end of said housing to empty each compartment; and sensing means for sensing the rate of rotation of said rotor means.

14. A milk volume metering unit according to claim 13, the lower end of said housing having a generally flat bottom wall surface portion and said first inlet port being in the form of a circumferentially extending shallow depression formed in the flat bottom wall surface portion.

15. A milk volume metering unit according to claim 14, said second outlet port being in the form of a radially extending relatively deep recess formed in the flat bottom wall surface portion of said housing.

16. A milk volume metering unit according to claim 15, further including an annular, generally concave surface portion in surrounding relation to said flat surface portion and curving upwardly from said flat surface portion.

17. A milk volume metering unit according to claim 13, said rotor means being in the form of inner and outer concentric tubular members having radial partitions extending at equally spaced circumferential intervals therebetween to divide said rotor means into a plurality of compartments of equal size, and vacuum bypass means communicating with said inner concentric tubular member through said second outlet port.

18. A milk volume metering unit according to claim 17, said outer tubular section disposed in outer spaced concentric relation to said inner tubular section and converging upwardly from a lower edge into closely spaced relation to said inner tubular section.

19. A milk volume metering unit according to claim 13, said rotor means being in the form of inner and outer spaced concentric, generally tubular sections, said outer tubular section converging upwardly into closely spaced relation to said inner tubular section at a point horizontally aligned with said float member, and a solid wall portion provided with circumferentially spaced vertically extending bores interconnecting the upper ends of said inner and outer concentric tubular sections, each of said bores communicating with a compartment in said rotor means.

20. In a liquid metering unit, a meter housing having a flow inlet at its upper end and a discharge port at its lower end;

flow control means for constraining the flow of liquid from said flow inlet along a generally spiral path around the inner wall of said housing;

sensing means to sense the level of the liquid in the lower end of said housing and to generate a signal in response to filling of said housing to a predetermined level;

rotor means mounted for rotation within said housing including equally spaced cavities disposed within the lower end of said housing normally isolated from the milk delivered by said flow control means into the annular space at the lower end of said housing between said rotor means and inner wall of said housing, each cavity being open at its lower end and movable across a first recess in communication with the liquid in the lower end of said housing to fill each cavity in succession to said predetermined level, each cavity rotatable in response to rotation of said rotor means past a second recess in communication with the discharge port in the lower end of said housing to empty each cavity.

21. In a liquid metering unit according to claim 20, each cavity being dimensioned to extend from the lower end of said housing to a point above the level of said sensing means and each cavity being of reduced size at a point aligned with said sensing means.

22. In a liquid metering unit according to claim 21, said first recess extending circumferentially around the outer peripheral edge of a flat surface portion formed in the lower end of said housing and having a relatively shallow recessed portion continuing into a relatively broad and deep recessed portion, each cavity communicating with the relatively broad and deep recessed portion for the flow of liquid from the lower end of said housing into each cavity in succession to fill each cavity to said predetermined level.

23. In a liquid metering unit according to claim 20, further including sensing means for counting the number of cavities traversing said second recess, and means for digitally displaying the total volume of liquid discharged through said recess based on the number of cavities traversing said second recess multiplied by the volume of each cavity.

24. The method of monitoring and measuring the milk volume production in cows comprising the steps of:
   withdrawing milk from the cow and directing it in a generally spiral path downwardly along the inner wall of a cylindrical enclosure at a progressively reduced rate of flow;
   collecting the milk within the lower end of said enclosure;
   inducing the flow of a predetermined amount of milk into each of a series of chambers advancing through the lower end of said enclosure;
   removing the milk from each chamber at a location remote from the point of introduction into said chamber; and
   counting the number of chambers as they are emptied at the point of removal.

25. The method according to claim 24, further characterized by directing the milk as it is withdrawn from the cow tangentially into said enclosure.

26. The method according to claim 24, further including the step of evacuating the enclosure through the location of milk removal prior to introduction of the milk from the cow into said enclosure.

27. The method according to claim 24, further characterized by permitting the enclosure to be filled to a predetermined level preliminary to flow into each of the series of chambers.

28. In a liquid metering unit:
   a meter housing having a metering chamber therein, said housing having a flow inlet through which liquid can flow into said chamber and a discharge port in the lower portion thereof;
   rotor means mounted for rotation within said chamber including at least one cavity disposed within said rotor means, said cavity normally isolated from the liquid flow into said chamber, said rotor cavity being open at its lower end and movable across an inlet means in communication with the liquid in said chamber to thereby fill such cavity to a predetermined level as such cavity moves across said inlet means, such cavity being subsequently movable past said discharge port whereby the liquid in such cavity will flow out said discharge port;
   drive means operatively connected to said rotor means to impart rotation to said rotor means;
   liquid level sensing means in said housing for sensing the level of liquid in said chamber and to energize said drive means when the liquid reaches a predetermined level in said chamber; and
   counting means to count the number of times liquid is discharged from such rotor cavity out said discharge port.

* * * * *